Sept. 19, 1933.   C. A. TEA   1,927,619

SPRING LEAF BEARING INSERT

Filed Jan. 3, 1933

INVENTOR.
CLARK A. TEA.
BY
*Jling Harness*
ATTORNEYS.

Patented Sept. 19, 1933

1,927,619

UNITED STATES PATENT OFFICE 1,927,619

SPRING LEAF BEARING INSERT

Clark A. Tea, Detroit, Mich., assignor to Chrysler Corporation, Detroit, Mich., a corporation of Delaware Application January 3, 1933. Serial No. 649,871

9 Claims. (Cl. 267—49)

This invention relates to improved bearings for leaf springs and particularly to bearings of this character for slidably supporting one of a pair of adjacent spring leaves upon the other.

The main objects of the invention are to provide bearings in a leaf spring for reducing the frictional resistance to sliding of the leaves with respect to each other; to provide bearings of this kind which are adapted to be installed in an assembled spring while the latter is mounted in a vehicle chassis; to provide porous metal bearing material which has a substantially large initial absorbed lubricant content in leaf spring bearing inserts; and to provide bearing material of this character which has a substantially large exposed bearing surface engageable with the leaves of a spring.

Other objects of the invention are to provide a retainer for the porous bearing material which has sharp, hardened, protruding edge portions that are adapted to dig into one of the spring leaves between which the device is disposed so as to hold the latter against bodily movement relative to one of the spring leaves; to provide means for holding the bearing device in place which does not require the formation of apertures or the reduction of the cross sectional area of the spring leaves at any location thereon; to provide a porous bearing material retainer which is formed of metal that is sufficiently flexible to permit of bending of the entire bearing unit into conformity with the curvature of the springs; to provide means for holding the porous bearing material and its retainer in a unitary assembled relation prior to and during installation thereof in a leaf spring; to provide a spring leaf bearing device having parts constructed and arranged in such a manner that the pressure with which one leaf of a spring is urged against the adjacent leaf may be relied upon to permanently hold the respective parts of the device together when it is disposed between the leaves of a spring; and to provide a simple and inexpensive spring leaf bearing element which may be inserted between adjacent leaves of a spring by separating the latter apart with the aid of a wedge or screw driver.

An illustrative embodiment of the invention is shown in the accompanying drawing, in which.

Figure 1:
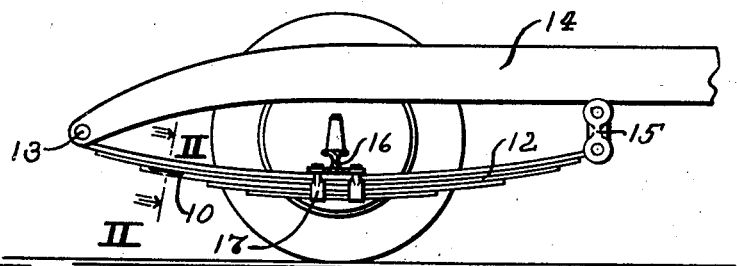
Fig. 1 is a fragmentary side elevation of a vehicle chassis which is equipped with a spring having bearings thereon embodying my invention.

My improved spring leaf bearing inserts 10 are illustrated in conjunction with a conventional vehicle leaf spring 12 which is pivotally attached at one end directly to a chassis frame 14 by an oscillating joint 13 and pivotally connected thereto at its other end by a shackle 15. The intermediate portion of the leaf spring 12 is rigidly fixed to an axle 16 by U-shaped clamping members 17 or other suitable means.

Figure 4:
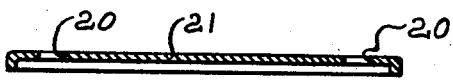
Fig. 4 is a transverse sectional view showing a part embodied in my improved spring leaf bearing insert as it appears in one stage prior to completion of its formation.

In the form shown, my improved spring leaf bearing insert includes a shallow cup-shaped retainer 18 which is preferably formed of sheet metal, such as steel. The retainer 18, illustrated in the drawing, is of circular contour but it may be formed in the shape of a rectangle or square or any other desired shape, and it is provided with a comparatively narrow side rim 19. The stock from which the retainer is made is preferably initially formed to the contour illustrated in Fig. 4 by a stamping operation during which it is provided with apertures 20. The outer side 21 of the metal stock is case hardened or otherwise suitably hardened to a depth of from .005" to .01". After the hardening operation, that portion of the metal stock surrounding the apertures 20 is punched outwardly so as to provide substantially sharp hardened edge portions 22 on the outer side of the closed extremity 23 of the retainer.

Seated in the retainer 18 is a disc shaped layer of bearing material 24 which preferably comprises a porous metal bearing composition having a substantial lubricant absorbing capacity. Suitable bearing compositions of this character can be formed by mixing together powdered metals which fuse at different temperatures and compressing such mixture to a briquette of desired shape between suitable dies. The briquette is then sintered at a temperature somewhat above the melting temperature of one of the powdered metal constituents and below the melting temperature of the other powdered metal constituents. The layer of bearing material 24 is immersed in a suitable lubricant and then either pressed into or loosely fitted in the retainer 18.

Figure 2:
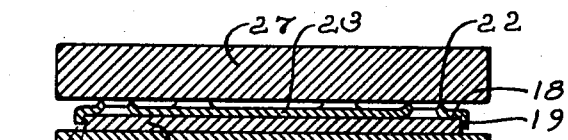
Fig. 2 is an enlarged, transverse sectional view taken on the line II—II of Fig. 1.
Figure 3:
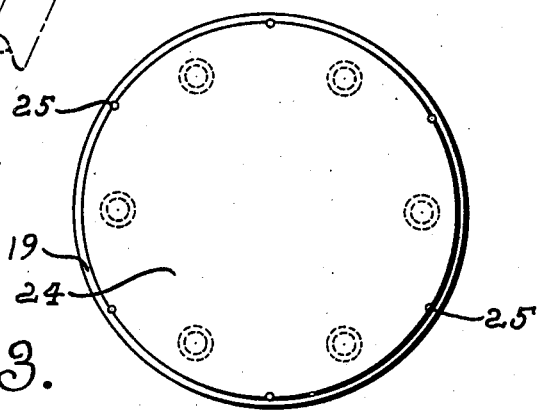
Fig. 3 is a plan view showing my improved spring leaf bearing as it appears from the outer side of the closed extremity of the retainer.

The retainer 18 and bearing element 24 may be fixed together in an assembled relation by staking the edge of the rim 19 of the retainer at spaced locations, as shown at 25 in Fig. 3. This operation may be performed with a comparatively sharp pointed punch 26 in the manner illustrated in Fig. 2. The punch 26 upsets a portion of the metal of the edge of the rim 19 and drives the same into the edge portions of the porous metal bearing element 24, thereby securely holding the retainer 18 and bearing element 24 together during and prior to assembling of the device between a pair of adjacent spring leaves 27 and 28.
My improved spring leaf bearings may be installed in a vehicle spring during assembling of the leaves thereof or they may be inserted between pairs of adjacent leaves of a completely assembled spring while the spring is mounted in a vehicle chassis by merely spreading such leaves apart, with the aid of a wedge or screw driver. When the wedge or screw driver is removed the pressure with which the leaves of the spring are urged together causes the sharp hardened edge portions 22 of the retainer to dig into one of the adjacent surfaces of the spring leaves. The outer surface of the layer of bearing composition 24 is exposed for engagement with the adjacent surface of the other spring leaf.

The pressure by which the spring leaves are urged together prevents separation of the retainer and layer of bearing composition and, in conjunction with the sharp edge portions 22, securely holds the bearing device against movement relative to one of the leaf springs. The contacting relation between the other leaf spring and the exposed bearing surface of the lubricant filled porous metal 24 materially reduces friction between the adjacent spring leaves and prevents the creation of squeaking and other objectionable spring noises. The sharp hardened edge portions 22 hold the bearings against displacement from the spring without requiring the formation of apertures in the spring leaves or other reduction of the cross sectional area of the spring leaves at any location therein.

Although but one specific embodiment of my invention is herein shown and described, it will be understood that various changes in the size, shape, and arrangement of parts may be made without departing from the spirit of my invention, and it is not my intention to limit its scope other than by the terms of the appended claims.
What I claim is:

1. A spring leaf bearing including a cup-shaped retainer having means on its outer extremity for cooperating with one of a pair of adjacent spring leaves to hold said bearing against displacement relative thereto, and a layer of bearing material in said retainer having an exposed bearing surface engageable with the other of said spring leaves.

2. A spring leaf bearing including a retainer comprising steel and having hardened protruding edges on its outer extremity for cooperating with one of a pair of spring leaves to hold said bearing against displacement relative thereto, and a layer of bearing material in said retainer having an exposed bearing surface engageable with the other of said spring leaves.

3. A spring leaf bearing including a retainer comprising steel and having hardened protruding edges on its outer extremity for cooperating with one of a pair of spring leaves to hold said bearing against displacement relative thereto, and a layer of porous metal having lubricant therein seated in said retainer and having a substantial exposed bearing surface engageable with the other of said pair of spring leaves.

4. A spring leaf bearing including a shallow retainer having substantially sharp edge portions integral with and protruding from the outer extremity thereof and including a comparatively narrow side rim, and a layer of bearing material in said retainer extending outwardly with respect to the latter beyond said side rim, spaced portions of said side rim extending into the edge of said layer of bearing material to hold the latter and said retainer in assembled relation.

5. A spring leaf bearing including a shallow retainer having substantially sharp edge portions integral with and protruding from the outer extremity thereof and including a comparatively narrow side rim, and a layer of porous metal bearing material in said retainer comprising a compressed and sintered mixture of powdered metal and having a bearing portion extending outwardly from said retainer beyond the side rim thereof, spaced portions of said side rim extending into the edge portion of said layer of bearing material to hold the latter and said retainer in an assembled relation.

6. A spring leaf bearing including a shallow sheet steel retainer having an outer extremity provided with apertures and having a comparatively narrow side rim, the metal of said outer extremity surrounding said apertures being bulged outwardly to provide substantially sharp protruding edges, and a layer of bearing metal seated in said retainer having a press fit within said side rim and extending outwardly of said retainer beyond said side rim.

7. A spring leaf bearing including a shallow sheet steel retainer having an outer extremity provided with apertures, the metal surrounding said apertures being hardened and bulged outwardly to provide substantially sharp protruding edges, and a layer of porous metal bearing material having a comparatively large absorbed lubricant content seated in said retainer and having a press fit within said side rim and extending outwardly of said retainer beyond said side rim.

8. A leaf spring lubricating device including a retainer having substantially sharp protruding elements on the outer surface of its end wall adapted to dig into one of a pair of spring leaves under the pressure with which said leaves are urged together, and a plate in said retainer having an exposed bearing surface engageable with the other of said pair of leaves, said plate being composed of an initially lubricant saturated porous metal comprising sintered metal powders.

9. A leaf spring lubricating device comprising unitary structure adapted to be inserted between a pair of adjacent leaves of a completely assembled leaf spring including a shallow, cup like, sheet metal receptacle having substantially sharp protruding elements on the outer side of its end wall adapted to dig into one of said spring leaves under the pressure with which said leaves are urged together so as to hold said lubricating device against displacement relative to one of said leaves, said receptacle having a substantially narrow rim, and a layer of bearing material seated in said receptacle and confined therein by said narrow rim and having an exposed bearing surface engageable with the other of said leaves.

10. A spring leaf bearing including a retainer comprising relatively hard metal and having hard protruding edges on one side for cooperating with one of a pair of spring leaves to hold said bearing against displacement relative thereto, and a layer of bearing material fixed to said retainer adjacent the opposite side thereof and having a bearing surface engageable with the other of said spring leaves.

11. A spring leaf bearing including a retainer comprising steel and having hard protruding edges on one side for cooperating with one of a pair of spring leaves to hold said bearing against displacement relative thereto, and a layer of porous metal having a substantially large absorbed lubricant content fixed to said retainer adjacent the opposite side thereof and having a bearing surface engageable with the other of said spring leaves.

CLARK A. TEA.